G. O. MORSE.
PROCESS OF MAKING MATERIAL FOR PUNCTURE PROOF TIRES.
APPLICATION FILED FEB. 7, 1917.

1,239,291. Patented Sept. 4, 1917.

Witness
Will Freeman

Inventor
George O. Morse
BY Owing & Bair
Attys.

UNITED STATES PATENT OFFICE.

GEORGE O. MORSE, OF DES MOINES, IOWA, ASSIGNOR OF ONE-SIXTH TO ALEXANDER M. LINN, ONE-SIXTH TO DWIGHT JARVIS, AND ONE-SIXTH TO WILLIAM W. HORRAS.

PROCESS OF MAKING MATERIAL FOR PUNCTURE-PROOF TIRES.

1,239,291.  Specification of Letters Patent.  Patented Sept. 4, 1917.

Application filed February 7, 1917. Serial No. 147,253.

*To all whom it may concern:*

Be it known that I, GEORGE O. MORSE, a citizen of the United States, and resident of Des Moines, in the county of Polk and State of Iowa, have invented a certain new and useful Process of Making Material for Puncture-Proof Tires, of which the following is a specification.

The object of my invention is to provide a pneumatic tire casing of simple construction, including a layer of inexpensive puncture proof material.

More particularly it is my object to provide such a tire having a layer of cotton or other suitable fabric, braided or woven and placed in compressed condition in the tire, and suitably connected with the other parts thereof.

Figure 1:
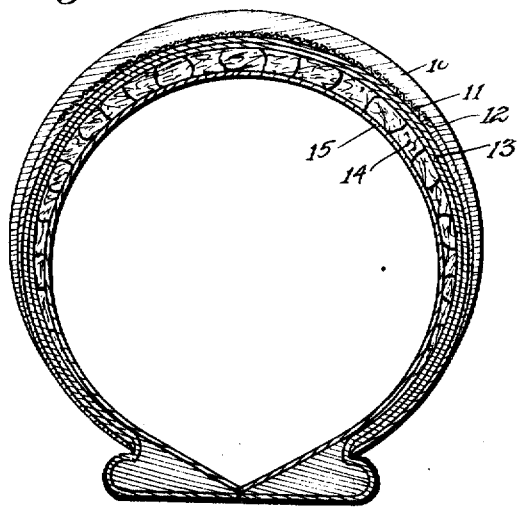
Figure 2:
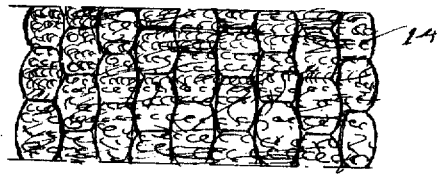

My invention consists in the construction, arrangement and combination of the various parts of the device whereby the objects contemplated are attained, as hereinafter more fully set forth, pointed out in my claims and illustrated in the accompanying drawings, in which:

Figure 1 shows a transverse, sectional view through a puncture proof tire embodying my invention, and Fig. 2 shows a top or plan view of a portion of the puncture proof layer.

In the illustration of my invention, shown in the accompanying drawings, I have used the reference numeral 10 to indicate the rubber tread or tread stock of a pneumatic tire casing. On the interior of the tread stock 10, and extending across the central tread portion of the tire is the ordinary breaker strip 11.

Inside the breaker strip is the ordinary cushion stock 12. Inside the cushion stock 12 are one or more layers of fabric 13. The layer of puncture proof material may be placed in different positions in the tire, but in the form shown in the drawings, is located just inside the lower layers of fabric 13.

This layer of puncture proof material is made of cotton splits or strips of cotton, preferably Sea Island cotton or some other high grade cotton, which as shown, are braided together to form a strip of suitable width to extend substantially around the tire from side to side, and entirely around the tire circumferentially.

It will be understood that these strips of cotton may be woven or braided together in any suitable way for forming them into a sheet or strip of proper size.

It is necessary for properly assembling the strip 14 of puncture proof material in the tire, that the strip 14 should be so prepared before being placed in the tire that it may be held compressed and that it may, when placed in the tire, be vulcanized or cooked with the tire, and so that it may be firmly and uniformly bound to the fabric 13 and to the inner fabric liner hereinafter mentioned.

It is desirable that the puncture proof layer 14 be made of strips of cotton or other suitable material, woven or braided, in order that the layer of puncture proof material, when assembled in the tire, may remain uniform, and so that the cotton will not tend to collect in bunches or slide or move with relation to the other parts of the tire. In order to make the material properly puncture proof, it is necessary that the strip 14 be placed in the tire in compressed condition.

For accomplishing this purpose, I preferably friction the puncture proof layer 14 on both sides. This is done by calendering the woven sheet or strip. That is to say, the woven sheet or strip is subjected to great pressure between the rolls of a calender, but at the same time, press into the surfaces of the puncture proof sheet or strip rubber, so that when the process of calendering is completed, the rubber will have been forced into both surfaces of the puncture proof strip, and will hold the puncture proof sheet or strip in the shape which it had assumed when placed under pressure. The puncture proof sheet or strip can then be handled without losing its shape or its compression.

The puncture proof strip is then placed in the tire adjacent to the fabric strips 13, and on the side of the puncture proof layer are one or more fabric liner layers 15.

I preferably locate the puncture proof layer nearer the inner part of the tire than the outer part, so as to leave as much tire body outside the puncture proof layer as possible. In other words, the puncture proof layer is arranged nearer the inner surface rather than the outer surface of the carcass.

The tire is then cooked in the ordinary way, and on account of the rubber that has been forced into the puncture proof layer, during the frictioning process, the puncture proof layer will be properly cemented to the fabric layers adjacent to its inner and outer surfaces.

I have conducted extensive experiments in the use of material such as cotton for making puncture proof tires, and have found that by simply placing a layer of cotton in the tire will not produce a satisfactory tire for several reasons.

In the first place the material so placed in the tire tends to collect in bunches under service conditions, resulting in rapid and uneven wear of the tire, and causes the tire to buckle. Furthermore to put an ordinary layer of cotton without any other treatment in the tire, results in the cotton breaking away from the other material of the tire, after which the tire rapidly disintegrates. It is, therefore, necessary in making a puncture proof tire with material of this kind, to in some way prepare the puncture proof layer by processes, the substantial equivalents of those herein described, namely, the arrangement of the cotton into strips; the braiding and weaving of the strips into a sheet; the compressing of the sheet so made; the treatment of the compressed sheet in some such way as to make the braided sheet hold its shape during the handling process, and the treatment of the surfaces of the puncture proof sheet with rubber, so that it will properly vulcanize to the other parts of the tire.

A tire of this kind is no more expensive than the ordinary type. The se of the puncture proof strip makes it possible to affect a saving by doing away with some of the material used in other tires.

The use of the puncture proof layer will do away with one or more of the layers, which it would otherwise be necessary to use.

The number of layers of fabric used depends upon the size of the tire being manufactured. A tire built in this way is practically puncture proof.

The material is no more expensive than that used in ordinary tires, and is assembled in the tire in the same manner and with the same labor as other layers or strips of fabric.

Some changes may be made in the construction, and arrangement of the parts of my improved puncture proof tire without departing from its essential features and purposes, and it is my intention to cover by this application, any such changes which may be included within the scope of my claims.

By the use of the term "braided" in my claims, I intend to include woven material, or any other means for arranging the strips of cotton or the like into a proper sheet.

I claim as my invention:

1. The process of making material for puncture proof tires, comprising the weaving together of strips of cotton, the subjecting of said strips to great pressure, and the forcing of rubber into the surfaces of such strips while they are under pressure.

2. The process of making material for puncture proof tires, comprising the weaving together of strips of cotton, the subjecting of said strips to great pressure, the forcing of rubber into the surfaces of such strips while they are under pressure, the placing of said material in a tire, and the securing of said material to the material of the tire.

3. The process of making material for puncture proof tires and the like, comprising the weaving of strips of cotton into a fabric, the forcing of rubber into the surfaces of said fabric under pressure, the laying of said fabric in a tire, and the compression and vulcanizing of said fabric to the material of the tire.

Des Moines, Iowa, January 13, 1917.

GEORGE O. MORSE.